United States Patent

Arbuckle et al.

[15] 3,656,108

[45] Apr. 11, 1972

[54] SIGNAL PRECONDITIONING METHOD AND TRANSMISSION SYSTEM

[72] Inventors: Timothy Arbuckle, Montclair; Herbert Sullivan, Fort Lee, both of N.J.

[73] Assignee: Computer Modem Corporation, Fort Lee, N.J.

[22] Filed: June 9, 1969

[21] Appl. No.: 831,669

[52] U.S. Cl. ................................340/146.1, 325/41, 325/65

[51] Int. Cl. .......................................................G08c 25/00

[58] Field of Search .........................325/41, 42, 56, 65, 323; 340/146.1

[56] References Cited

UNITED STATES PATENTS

| | | | |
|---|---|---|---|
| 3,414,845 | 12/1968 | Lucky | 325/42 X |
| 3,502,986 | 3/1970 | Lucky | 325/42 X |

OTHER PUBLICATIONS

Cooley, et al., Application of the Fast Fourier Transform To Computation of Fourier Integrals, Fourier Series, and Convolution Integrals, IEEE Transaction on Audio and Electroacoustics, Vol. AU- 15, No. 2, June 1967, pp. 79- 84.

*Primary Examiner*—Malcolm A. Morrison
*Assistant Examiner*—Charles E. Atkinson
*Attorney*—Watson, Leavenworth & Kelton

[57] ABSTRACT

A system for intelligible exchange of signals through noise-affected communication channels. Apparatus is provided in a transmitting station for preconditioning signals intended to be transmitted over a telephone line or like channel to a remote receiving station. The preconditioning apparatus is operative to modify characteristics of said signals in accordance with further signals generated at the receiving station and indicative of channel transmission characteristics, the preconditioning resulting in a uniform distribution or spreading of channel spike noise throughout received signals. Noise uniformity in received signals permits ready determination of the said signals intended to be transmitted. A method of preconditioning digital data signals for such exchange is particularly set forth.

10 Claims, 1 Drawing Figure

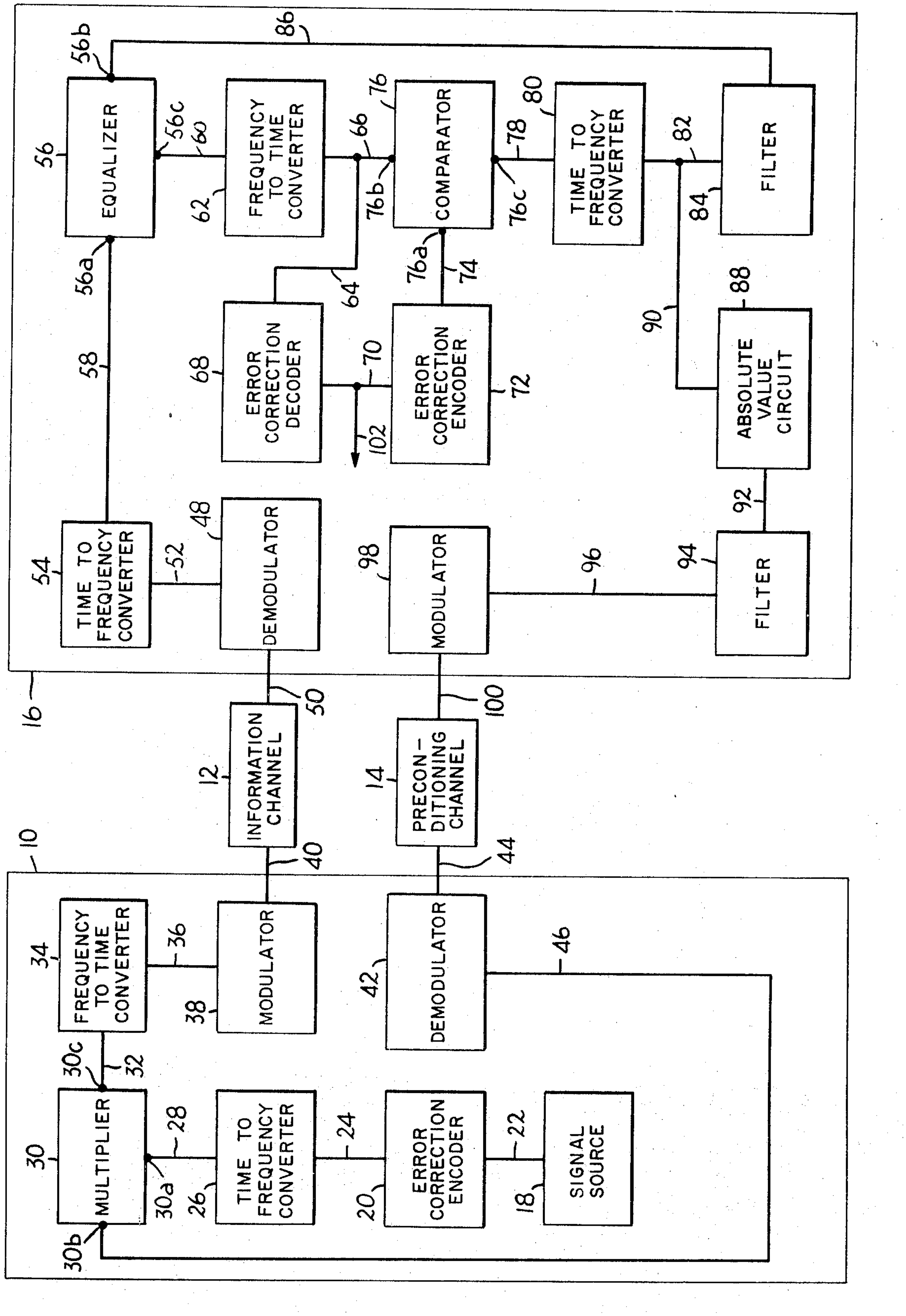
EQUALIZER
FREQUENCY TO TIME CONVERTER
COMPARATOR
TIME TO FREQUENCY CONVERTER
FILTER
ERROR CORRECTION DECODER
ERROR CORRECTION ENCODER
ABSOLUTE VALUE CIRCUIT
TIME TO FREQUENCY CONVERTER
DEMODULATOR
MODULATOR
FILTER
INFORMATION CHANNEL
PRECON-DITIONING CHANNEL
FREQUENCY TO TIME CONVERTER
MODULATOR
DEMODULATOR
MULTIPLIER
TIME TO FREQUENCY CONVERTER
ERROR CORRECTION ENCODER
SIGNAL SOURCE

SIGNAL PRECONDITIONING METHOD AND TRANSMISSION SYSTEM

This invention relates to signal transmission systems and more particularly to a transmission system for the exchange of digital data signals through noise-affected communication channels.

A foremost consideration in the high speed transmission of digital data signals from a transmitting station to a receiving station through a communication channel is spurious noise, commonly referred to as spike noise, observable in received signals. In present transmission systems such noise, attributable in large part to capacitive and inductive coupling of the communication channel to external circuits, has had a direct and deleterious effect on the intelligibility of received signals, necessitating retransmission of the information until it is received in intelligible form. Transmission efficiency, measured by the volume of useful information transmitted per unit time, decreases with each such retransmission. Where channel noise is excessive, transmission efficiency has been decreased to such an extent as to render use of the transmission system impractical.

Since channel noise is generally regarded as unavoidable in the design of transmission systems, various compromises have been made to permit operation in a relatively noisy environment. A basic compromise is that of increasing transmitter power to thereby increase the signal-to-noise ratio in the receiver with resulting improvement in the intelligibility of received signals. The physical limitation on transmitter power is the significant factor limiting the effectiveness of this compromise. A further design feature which has heretofore been employed is bandwidth limiting, wherein usable bandwidth is exchanged for an increase in the signal-to-noise ratio. Other than in special situations wherein substantial common reduction of sidebands is permissible, this compromise has not found practical application.

It is an object of the present invention to provide a signal transmission system operative in conjunction with noise-affected communication channels and permitting increased intelligibility in exchanged signals.

It is a further object of the invention to provide a signal transmission system having improved noise immunities independently of transmitter power and bandwidth considerations.

It is an additional object of the invention to provide a method of preconditioning signals intended to be transmitted over noise-affected communication channels in such manner as to enhance intelligible exchange of the information content of such signals.

In accordance with the present invention, first signals, indicative of information intended for exchange between a transmitting station and a remote receiving station, are combined with second signals derived from the receiving station and indicative of the communication channel transmission characteristics. Third signals resulting from such combination are modulated and applied to the communication channel. Upon receipt at the remote station, such modulated and transmitted third signals are equalized for communication channel induced distortions therein. By virtue of said preconditioning, said transmission channel operation on said preconditioned signals, and said receiver equalization, there result in the receiver fourth signals corresponding to said first signals in an environment characterized by a noise uniformity. The information content of said first signals is readily determinable from said fourth signals in such environment, a determination substantially unaffected by spike or peak noise which may have been present on the channel during transmission of said third signals.

In further attaining the above stated objectives, the system includes in the receiver thereof cooperative and interdependent subsystems generating signals adapted for use in said preconditioning and said equalization. In a preferred embodiment, the invention is disclosed by way of a digital data transmission system adapted to exchange error-correction encoded digital data signals between two stations interconnected by a conventional telephone line. In this embodiment, said preconditioning and equalization signals are derived through use of the system error correction code.

The above and other objects of the invention will be evident from the following detailed description of a preferred embodiment of a system employing the invention and from the drawing thereof illustrated in FIG. 1.

For a general understanding of the present invention, it will be helpful initially to consider the basic prior art transmission system as a time variant model, and thereby to define in mathematical terms the environment in need of correction. The transmitter of the basic system generates batches of appropriately modulated signals $m(t)$ defining a particular digital message to be transmitted. The message, in transmission on a communication channel encounters distortion $c(t)$ attributable to departures of the channel amplitude and phase frequency responses from ideal (constant) responses. Further, the message is affected by spurious noise $n(t)$. The message issuing from the communication channel, $x(t)$, represents a convolution of the message applied to the channel with the channel transmission characteristic, i.e., the convolution of $m(t)$ and $c(t)$. Noise $n(t)$ is additive to this convolution.

In the receiver, $x(t)$ is equalized, typically by dividing $x(t)$ by an equalization signal, $L(t)$, computed to have a value equivalent to $c(t)$ by processing received messages to determine channel-induced distortions therein. Since such equalization does not accommodate compensation for noise, the resulting equalized received message signal, $r(t)$, is distinct from $m(t)$ by noise errors, assuming perfect equalization. The time variant model discussed can be expressed as follows:

$$m(t)\,c(t)+n(t)=x(t) \qquad (1)$$

$$x(t)/L(t)=r(t), \text{ where } L(t) \text{ equals } c(t) \qquad (2)$$

$$r(t)=m(t)+n(t)/L(t) \qquad (3)$$

Where time coincident with $m(t)$, and of comparable power to $m(t)$, $n(t)$ is clearly effective to erroneously modify the message intended to be exchanged. Where $n(t)$ is of comparable power to $m(t)$ and not time-coincident, it may be considered part of $m(t)$, again with adverse effects on transmission accuracy.

The system of the invention is adapted to provide complete accord between $r(t)$ and $m(t)$ by spreading $n(t)$ uniformly throughout the spectrum and thus rendering noise content in $r(t)$ readily identifiable. The manner in which this is accomplished will be evident from consideration of the system of FIG. 1 and operation thereof. In this discussion, various shifts from the time to the frequency domain will be made. The significance of such shifts will be explained hereinafter when the mathematical basis of the system is considered.

Transmitting station 10 of FIG. 1 is connected by communication channels 12 and 14 to a remote receiving station 16. Channel 12 is employed for information signal exchange and is directed from station 10 to station 16. Typically, it is a conventional telephone line having a transmission characteristic $c(t)$, non-ideal by virtue of departures in the amplitude and phase frequency responses thereof from a constant level. Channel 14 is employed for preconditioning signal exchange and is directed from station 16 to station 10. A like telephone line may be used for this channel, or the channels may be appropriately multiplexed on a single telephone line.

Since the system of FIG. 1 is based in part in its operation upon a particular type of transmitted signal, namely error correction encoded data signals, it will be advantageous initially to discuss the characteristics thereof. It is customary in digital data transmission systems to include at the data transmitting station an encoder operating upon data provided by the data source to insert into the blocks of transmitted data an error correction code. For example, $x$ error control bits may be calculated by the encoder to indicate independently the correct contents of $y$ data bits generated by the data source by an error correction code in which each of the error control bits is assigned to a particular combination of data bits, e.g., even pairs, alternate odd pairs, etc. The ratio of $y$ to $x$ is selected to provide maximum transmission by volume of utilizable information (data bits) and yet provide adequate error detection and correctability for the information. The composite $x$ and $y$ message is transmitted on the communication channel and is applied to error control detection apparatus in the receiver. In this receiver apparatus wherein the system error correction code is known (stored), the detected data is analyzed for its correctness, required corrections being made to data signals erroneously transmitted by the channel. The corrected data signals are then supplied to a data utilization device. Since the system error correction code involves a compromise between the relative number of $y$ bits to $x$ bits, occasions arise where the receiver apparatus is unable to correct the received signals, i.e., where the received signals contain errors in excess of the correction capacity of the chosen error correction code. In such case, the receiver generates a repeat transmission request and the data transmitter complies by repeating the transmission. Extensive discussion of error correction techniques and of particular error correction codes is presented in *Error-Correcting Codes*, by W. W. Peterson, published jointly by M.I.T. Press and John Wiley & Sons, Inc. (1961). Error correction encoder apparatus is set forth in this text in FIG. 12.6, and error correction decoder apparatus is set forth in FIGS. 12.7 and 12.8.

Digital data signals intended for exchange are generated by signal source 18 of station 10. Such signals are error-correction encoded in the above-described manner by encoder 20, being applied thereto over line 22. Encoder output signals, constituting the $m(t)$ message, are conducted over line 24 to fourier transformer 26, a time-to-frequency conversion means adapted to generate an output signal, $m(\omega)$, indicative of the frequency spectrum of the applied signal. Such output signals are conducted over line 28 to input terminal **30*a* of multiplier 30**. Various Fourier transform computers are commercially available, e.g., the Time/Data 100, manufactured by Time/Data Corp., Palo Alto, California.

Multiplier 30 is operative to multiply message signals applied to terminal **30*a* thereof by further signals applied to input terminal 30*b* thereof. These further signals, the manner of generation of which will be discussed below, will be referred to as preconditioning signals, and are provided to 30 as frequency spectra signals, $g(\omega)$. The product signals developed by multiplier 30 at output terminal 30*c* thereof are applied over line 32 to inverse fourier transformer 34. This unit is operative to convert applied frequency domain signals into time domain signals. Such output signals are applied over line 36 to transmitting station modulator 38. This unit may embody any suitable form of signal modulation to condition applied signals for transmission over channel 12, such modulated signals being conducted to the channel over line 40**.

A demodulator 42 is included in transmitting station 10 for receiving said preconditioning signals in modulated form from channel 14 over line 44, and for providing demodulated versions thereof over line 46 to the input terminal **30*b* of multiplier 30**.

Receiving station 16 incorporates a demodulator 48 receiving transmitted signals from channel 12 over line 50. The demodulated output signals, $x(t)$, are led over line 52 to fourier transformer 54 which provides the frequency spectra signals $x(\omega)$, to equalizer 56 over line 58. These signals are applied particularly to input terminal **56*a* of the equalizer and are modified by the equalizer in accordance with further signals applied to terminal 56*b*. Under well-known equalization techniques, $x(\omega)$ signals are so processed as to eliminate therefrom distortions therein attributable to said transmission characteristics of the communication channel. Typically, a signal $L(t)$ is generated for this purpose and is ideally the converse of the transmission characteristic. In the system of FIG. 1, this signal is provided in the frequency domain as $L(\omega)$, and equalizer 56 is adapted to divide the signals appearing at terminal 56*a* by the signals appearing at terminal 56*b* to provide at output terminal 56*c*** equalized signals $r(\omega)$.

These equalized signals are conducted by line 60 to inverse fourier transformer 62 which is effective to return applied signals to the time domain, providing at lines 64 and 66 the signals, $r(t)$. Line 64 conducts the signals to decoder 68 wherein the error correction code bits are extracted from $r(t)$, and the data content thereof is corrected as needed. The corrected data signals are led over line 70 to encoder 72, a direct counterpart to transmitting station encoder 20. This unit is operative to generate as its output signals an error correction encoded version of applied signals. Such output signals will be recognized as identical to the output of encoder 20 where error correction of the received message is within the capacity of decoder 68. Such signals, a reconstituted $m(t)$, are provided on line 74 to input terminal **76*a* of comparator 76**.

Input terminal **76*b* of comparator 76 receives $r(t)$ signals from line 66. The comparator is a difference determining device adapted to subtract the signals applied to terminal 76*a* from the signals applied to terminal 76*b* and to generate difference signals $h(t)$ at output terminal 76*c* thereof. These signals are conducted over line 78 to fourier transformer 80** which provides output signals indicative of $h(\omega)$.

The output signals of fourier transformer 80 are applied over line 82 to a first filter 84 having a time constant selected to suppress the noise content of such signals. This filter applies to line 86 and thus to input terminal **56*b* of equalizer 56** signals $L(\omega)$ indicative of low frequency variations of the comparator output signals. These signals correspond to corrections required in $r(t)$ to compensate same for transmission channel distortions induced therein.

Fourier transformer 80 output signals are applied also to absolute value circuit 88 over line 90, the output signals of this circuit being conducted over line 92 to a second filter 94. This filter has a time constant selected to pass the noise content of comparator 76 output signals. Such high frequency pass filter provides on line 96 to receiving station modulator 98 the said preconditioning signal previously discussed. Modulator 98 conditions these signals for transmission through channel 14, same being applied thereto over line 100.

Decoded $r(t)$ signals provided by decoder 68 with necessary corrections on line 70 are directly usable and may be provided to any suitable utilization device by line 102. These signals are identical with the $d(t)$ signals generated by source 18 of transmitting station 10 as will be established in the following explanation of system performance by mathematical analysis of operations therein. Such explanation will be made with reference only to frequency domain signals for purposes of brevity.

The signals applied to channel 12 by station 10 may be expressed as $g(\omega)$ times $m(\omega)$. In transmission over the channel, the aforementioned convolution of these signals in time with $c(\omega)$ occurs as does the addition of noise $n(\omega)$. Thus, the received signals, $x(\omega)$, may be expressed as follows:

$$x(\omega) = [m(\omega)\, g(\omega)\, c(\omega)] + n(\omega) \qquad (4)$$

Upon equalization in equalizer 56, $r(\omega)$ is developed:

$$r(\omega) = x(\omega)\, L(\omega^{-1} \qquad (5)$$

$$r(\omega) = [m(\omega)\, g(\omega)\, c(\omega)]\, L(\omega)^{-l} + n(\omega)\, L(\omega)^{-1} \qquad (6)$$

Comparator 76 generates a signal $h(t)$ representing the difference between $r(t)$ and the reconstituted $m(t)$, which may be expressed in the frequency domain as:

$$h(\omega) = [m(\omega)\, g(\omega)\, c(\omega)]\, L(\omega)^{-1} + n(\omega)\, L(\omega)^{-}1 - m(\omega) \qquad (7)$$

or $$h(\omega) = m(\omega)\, [g(\omega)\, c(\omega)\, L(\omega)^{-1} - 1\,] + n(\omega)\, L(\omega)^{-1} \qquad (8)$$

In order that the system of the invention fulfill the dual purpose of equalization and such preconditioning that noise is uniform in received signals, the first of the terms of the expression (8) must go to zero and the second of the terms must go to unity. The separateness of these two terms is directly related to the relative sensitivities of filters 84 and 94. Filter 84 is effective to suppress noise content of applied signals and thus equalization occurs apparently independently of $n(\omega)$. The first term will approach zero as $g(\omega)\, c(\omega)\, L(\omega)^{-1}$ approaches unity. The second of the terms will approach unity as $L(\omega)^{-1}$ approaches $n(\omega)$.

As a first step in causing these conditions to occur, let us set $g(\omega)$ equal to unity. This may be accomplished practically by interrupting continuity between filter 94 and multiplier 30 and providing a unity signal to the multiplier. Assuming the initial message and noise to be received at receiving station 16, equalization thereof will occur by generation of a first equalizing signal, $L_1(\omega)$ by filter 84. $h_1(\omega)$ will be:

$$h_1(\omega) = m(\omega)\,[1.0\,c(\omega)\,L_1(\omega)^{-1} - 1] + n(\omega)\,L_1(\omega)^{-1} \quad (9)$$

In order to attain equalization, $L_1(\omega)$ will assume such value that the first term of the expression shall go to zero. Thus, $L_1(\omega)$ will become equal to $c(\omega)$.

If $g(\omega)$ were maintained at 1.0, the comparator output would go to $n(\omega)\,L_1(\omega)^{-1}$, and no further equalization other than the above would occur. However, let $g(\omega)$ now proceed to follow the comparator output, $n(\omega)\,L_1(\omega)^{-1}$. A second comparator output develops as follows:

$$h_2(\omega) = m(\omega)\,[n(\omega)\,L_1(\omega)^{-1}\,c(\omega)\,L_2(\omega)^{-1} - 1] + n(\omega)\,L_2(\omega)^{-1} \quad (10)$$

Again, in order to attain equalization, $L_2(\omega)$ must assume a value to drive the first term to zero, or $$L_2(\omega) = n(\omega)\,c(\omega)\,L_1(\omega)^{-1} \quad (11)$$

But $$L_1(\omega) = c(\omega), \text{ thus}$$

$$L_2(\omega) = n(\omega)$$

The loop having now been closed by resumption of continuity between filter 94 and multiplier 30, the relation (10) becomes:

$$h_2(\omega) = 0 + n(\omega)\,L_2(\omega)^{-1} \quad (11)$$

or $$h_2(\omega) = n(\omega)\,n(\omega)^{-1} = 1.0 \quad (12)$$

Upon this condition, the transformer 80 output signal equals unity, a frequency spectra signal indicative of the presence of uniform noise in received signals. A uniform environmental noise background has thus been created in the receiver, despite that time varying noise, such as spike noise, may exist independently on channel 12. Equalization is concurrently provided. Detection of the information content $d(t)$ of received signals, accomplished in decoder 68, may now be made irrespective of independent noise characteristics of the channel.

Characteristic of the system and method of the invention is the provision of cooperative elements in the transmitting and receiving stations which force the noise power spectrum of received signals to unity. Implicit in this cooperation of elements is the provision in the transmitting station of a signal bearing a sufficient relation to channel noise as to permit use thereof in the shaping of the frequency spectrum of signals actually transmitted. In effect, messages are packed less densely by the transmitter in those parts of the spectrum which are particularly noisy, with the result that the likelihood of error is equi-probable throughout the spectrum and substantially reduced in any given area of the spectrum.

While the preconditioning of signals in this manner has been accomplished in the preferred embodiment of the transmission system of FIG. 1, by multiplication of such receiver-provided signals and signals intended to be transmitted, other combination of these signals, e.g., by division, may clearly be accomplished to provide similar results. It is required only that there occur a modification of the characteristics of signals intended to be transmitted in accordance with receiver-provided signals indicative of the noise characteristics of the communication channel.

The incorporation in the system of FIG. 1 of time-to-frequency and frequency-to-time conversion means is primarily intended for simplification of the computations required to implement the expressions and relations discussed above. In this connection digital computers may be used for the computation of fourier transforms, such techniques being discussed in detail in *IEEE Transactions on Audio and Electrical Acoustics*, June 1967, pages 79–84. Specific discussion of the implementation of the IBM 7094 computer for Fourier transform computation is presented in *Proceedings—Fall Joint Computer Conference*, 1966, pages 563–578. Apparatus for use in equalizer 56 is similarly well known and reference may be had to *IEEE Spectrum*, Jan. 1967, pages 53–69 and *Bell System Technical Journal*, Feb. 19, 1966, pages 255–286 for typical equalization systems.

While the invention has been disclosed by way of a particularly preferred embodiment for the transmission of digital data signals between remote terminals connected by telephone lines, various modifications will be evident both as to applications and apparatus for implementing the invention. For example, the difference signals provided to filters 84 and 94 of the system of FIG. 1 may be generated without recourse to the system error-correction code, but by other equalization and noise sensing techniques and apparatus. The embodiment discussed above is thus intended in a descriptive and not in a limiting sense. The full scope of the invention will be evident from the following claims.

What is claimed is:

1. A method for exchanging the information content of first message signals over a noise-affected communication channel with reduction of adverse effects of communication channel noise, comprising the steps of:

a. generating second signals indicative of the frequency spectrum of said first message signals;
b. modifying said second signals by combination thereof with third signals;
c. performing a frequency-time conversion on said modified second signals and thereby generating fourth signals, said modified second signals being indicative of the frequency spectrum of said fourth signals;
d. transmitting said fourth signals over said communication channel;
e. equalizing said transmitted fourth signals, said equalized signals providing said first message signal information content;
f. detecting noise signals present in said equalized signals; and
g. generating signals indicative of the frequency spectrum of said noise signals, said thus generated signals constituting said third signals.

2. The method claimed in claim 1 comprising further an initial step of error correction encoding said first message signals, and error correction decoding and error correcting said equalized signals.

3. The method claimed in claim 1 comprising the additional step of modulating said fourth signals prior to said transmitting step and the further step of demodulating said transmitted modulated fourth signals prior to said equalizing step.

4. The method claimed in claim 1 wherein said steps of generating said second signals and of generating said signals indicative of the frequency spectrum of said noise signals include steps of computing the forward Fourier transforms of said first message signals and said noise signals respectively, and wherein said step of generating said fourth signals includes the step of computing the inverse Fourier transform of said modified second signals.

5. The method claimed in claim 1 wherein said step of modifying said second signals by combination thereof with third signals is performed by multiplying said second signals by said third signals.

6. A signal transmission system for exchanging the information content of first message signals over a noise-affected communication channel with reduction of adverse effects of communication channel noise, comprising:

a. a transmitting station including:
  a–1. a source generating said first message signals;
  a–2. first signal conversion means receiving said first message signals and generating second signals indicative of the frequency spectrum of said first message signals;
  a–3. signal combining means receiving said second signals and third signals and generating modified second signals;
  a–4. second signal conversion means receiving said modified second signals and performing a frequency-time conversion thereon and thereby generating fourth signals, said modified second signals being indicative of the frequency spectrum of said fourth signals; and a–5. signal conducting means applying said fourth signals to said communication channel; and b. a receiving station comprising:

b–1. signal conducting means receiving transmitted fourth signals from said communication channel;

b–2. means equalizing said transmitted fourth signals for distortions induced therein by said communication channel, said equalized signals providing said first message signal information content;

b–3. means detecting noise signals present in said equalized signals; and b–4. means generating signals indicative of the frequency spectrum of said noise signals, said thus generated signals constituting said third signals;

said system including further means for conducting said third signals to said signal combining means.

7. The signal transmission system claimed in claim 6 wherein said signal combining means includes means multiplying said second signal by said third signal.

8. The signal transmission system claimed in claim 6 wherein said transmitting station signal conducting means includes a signal modulator and wherein said receiving station signal conducting means includes a signal demodulator.

9. The signal transmission system claimed in claim 7 wherein said first message signals are digital signals and wherein said transmitting station first signal conversion means and said receiving station signal conversion means include means for computing the forward Fourier transform of signals applied thereto and said transmitting station second signal conversion means includes means for computing the inverse Fourier transform of signals applied thereto.

10. The signal transmission system claimed in claim 7 wherein said transmitting station first message signal generating means includes means error correction encoding said first message signals, and said receiving station includes means error correction decoding and error correcting said equalized signals.

* * * * *